UNITED STATES PATENT OFFICE.

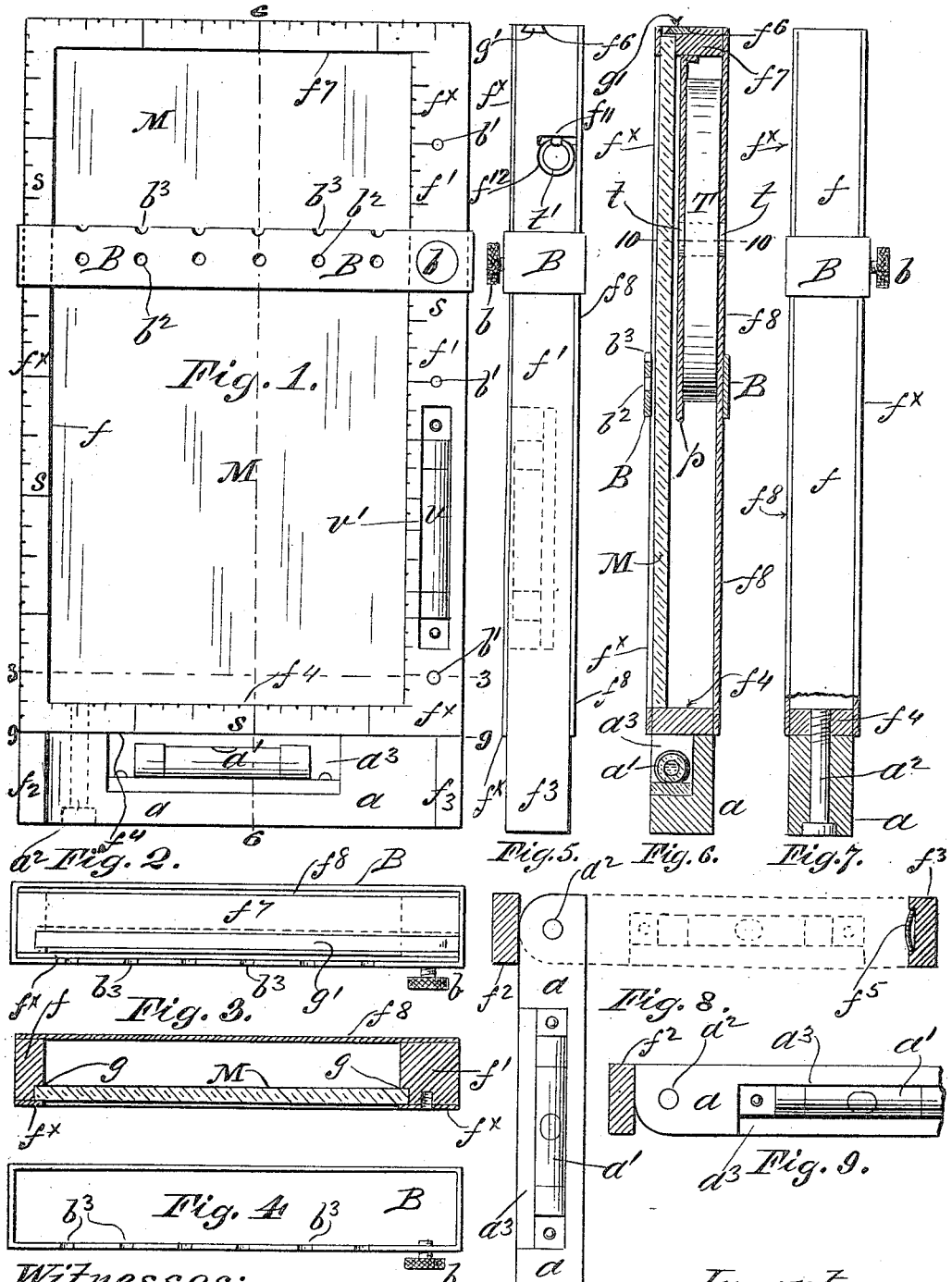

GUSTAV SWENSON, OF NEW YORK, N. Y.

SQUARE, LEVEL, AND PLUMB DEVICE.

1,123,952.  Specification of Letters Patent.  Patented Jan. 5, 1915.

Application filed June 11, 1914. Serial No. 844,521.

*To all whom it may concern:*

Be it known that I, GUSTAV SWENSON, a native of Sweden, having declared my intentions of becoming a citizen of the United States, and residing in the borough of Manhattan, city, county, and State of New York, have invented certain new and useful Improvements in Square, Level, and Plumb Devices, of which the following is a specification.

The object of my invention is the provision of means for visually projecting and ascertaining horizontals and verticals in the industrial arts, particularly in architecture and building, and consists primarily in the combination and arrangement, with one or more spirit levels, of a mirror positioned in a plane at right angles thereto, whereby the reflection of a line of projection may be utilized in ascertaining the line of deflection from the rectangular as related to the mirror, and whereby also the correct line of projection may be attained, as hereinafter more fully set forth.

The invention also includes certain other details in the construction and arrangement of parts hereinafter described and claimed specifically.

In the accompanying drawings, Figure 1, is what may be designated as a front elevation of my square, level and plumb device; Fig. 2, a top view thereof; Fig. 3, a transverse section upon plane of line 3—3 Fig. 1; Fig. 4, is a detail view of the horizontal projecting line support; Fig. 5, is an elevation of the right hand edge of the device; Fig. 6, a sectional elevation taken upon plane of line 6—6 Fig. 1, the projection line support being in a lower position than that shown in Fig. 1; Fig. 7, is an elevation of the left hand edge of the device partly broken away and in section to show the pivotal support for the swinging spirit level; Fig. 8, is a section taken upon plane of line 9—9 Fig. 1, showing the horizontal test spirit level swung out at right angles to the mirror frame; Fig. 9, a partial sectional view on the same plane showing said horizontal test spirit level in position within and under the mirror frame.

The basis of my structure is an elongated rectangular frame of steel or other suitable material the side members $f$, $f'$, being extended at the bottom to form posts $f^2$, $f^3$, between which is the recess for the accommodation of the swinging arm $a$, in which the horizontal test spirit level $a'$, is mounted, said arm $a$, being pivotally supported on the lower cross bar $f^4$, of the frame, by a screw $a^2$, as shown in Fig. 7. The spirit level $a'$, (and by the term spirit level I herein mean to designate the ordinary spirit or water level in general use, or any suitable equivalent thereof) is positioned in a recess $a^3$, formed for its reception in the arm $a$, said recess being open at the top and front side of the arm. The end of the latter opposite to that at which it is pivoted to the lower cross member $f^4$, of the frame is formed with a depression $a^4$, into which a spring $f^5$, countersunk in the extension $f^3$, fits when the arm $a$, is in closed position to retain the said arm within the frame line until the horizontal test level $a'$, is desired for use. Another spirit or equivalent level which may be designated as the vertical test level $v$, is mounted in the side member $f'$, of the frame, being countersunk in a recess $v'$, formed for its reception in said side member $f'$, said recess being open in the front side of the frame as shown in Fig. 1. This front side of the frame F, is provided with a face plate $f^x$, bearing on its edges a suitable scale $s$, surrounding the sight opening through which the mirror M, is exposed to view. If preferred however, the face plate $f^x$, may be omitted and the scale $s$, formed directly upon the front surfaces of the frame F, as may be found most expedient in manufacture.

The longitudinal edges of the mirror M, rest in grooves $g$, $g$, in the side members $f$, $f'$, of the frame, the lower edge of the said mirror resting upon the cross bar $f^4$, of the frame, and it being locked in position in the frame by a dove-tail slide $g'$, at top, said slide fitting in a dove-tail groove $f^6$, formed for its reception in the top member $f^7$, and being retractably mounted therein in such manner as to be readily withdrawn or inserted longitudinally. When the mirror M, is in place in the frame and the slide $g'$, closed the latter overlaps the upper end of the mirror as shown particularly in Fig. 6, and thereby locks the mirror against movement within the frame.

The rear of the frame is closed by a plate $f^8$, and the space between said plate $f^8$, and the back of the mirror M, I utilize for the housing and accommodation of a tape measure T, the axis or spindle $t$, of which is mounted in said rear plate $f^8$, and in a cross-shaped partition $p$, spaced back of the mirror M, sufficiently to prevent contact therewith. The tape T, passes out through an opening $f''$, in the side member $f'$, of the frame, the end of the tape being secured to the usual ring or handle $t'$, for which a recess $f^{12}$, may be provided in the outer surface of the side member $f'$.

B, represents a slide band fitting over the frame, slidable thereon, and provided with means whereby it may be held in prescribed positions thereon, as by means of a set screw $b$, for which screw holes $b'$, may be provided in the side member $f'$, of the frame. The front member of this slide B, is formed with a series of cord holes $b^2$, and edge notches $b^3$, a string, cord or wire, having the free end thereof through one of the cord holes $b^2$, from the front to the rear of the slide and then forward through the corresponding edge notch $b^3$. This brings one end of the projecting of test cord, wire or string in close proximity to the face of the mirror M.

The device is used as follows. Supposing it is desired to test, prove, or project a horizontal line or surface, the arm $a$, is swung out at right angles to the mirror, or substantially so. When the level $a'$, indicates the true horizontal the mirror will be in a true vertical position, and hence if the testing cord $c$, (of any required length) is brought into perfect alinement with its reflection in the mirror M, it is obvious that said projecting cord extends in a true horizontal line. By this means surfaces may be either tested or projected. Any variation from the true horizontal will be indicated by the reflection of the cord in the mirror, and may be read off from the scale $s$. In measuring or projecting vertical lines the arm $a$, is closed, and the device turned into the hroizontal position, which is ascertained by means of the level $v$.

The usual "try-square" used in carpentry, &c., does not ordinarily exceed two feet in length, hence its usefulness is restricted. By my device I can prove, try or project surfaces or lines of any desired extension, and can quickly and conveniently ascertain any deviation from the plumb, square or level. Furthermore the device is simple, cheap, and effective, and not liable to get out of order. By its use building operations may be greatly facilitated, and it may be used in various emergencies where otherwise surveying instruments would have to be resorted to.

What I claim as my invention and desire to secure by Letters Patent is,

1. In a device of the character designated, a frame, a mirror mounted in said frame, said frame having a sight opening through which said mirror is exposed to view, a leveling device arranged to ascertain the true vertical position of said mirror, a band slidably mounted on said frame over the mirror and provided with a plurality of cord holes and edge notches, and a cord holding device adjacent to said mirror and adjustable with relation thereto and embodying a cord for coöperation with said holes and notches for the purpose described.

2. In a device of the character designated, a frame, a mirror mounted in said frame, said frame having a sight opening through which said mirror is exposed to view, a swinging arm pivotally connected with said frame, a band slidable upon said frame over said mirror and carrying a cord, and a leveling device mounted on said swinging arm, for the purpose described.

3. In a device of the character designated, the combination of a mirror, a supporting frame the edges of which adjacent to the face of the mirror are formed with a scale, a leveling device arranged to ascertain the true vertical position of the mirror, a band slidable on said frame and a cord carried by said band for coöperation with said mirror, for the purpose described.

4. In a device of the character designated, the combination of a mirror, a supporting frame the edges of which adjacent to the face of the mirror are formed with a scale, a swinging arm pivotally connected with said frame, a leveling device mounted on said swinging arm, a band slidable on said frame and a cord carried by said band for coöperation with said mirror, for the purpose described.

5. In a device of the character designated, the combination of a mirror, a supporting frame the edges of which adjacent to the face of the mirror are formed with a scale, a band slidable on said frame and having cord openings and notches, a cord coöperating therewith and with said mirror, and a leveling device on said frame arranged to ascertain the true horizontal position of said mirror, for the purpose described.

GUSTAV SWENSON.

Witnesses:
 Geo. Wm. Miatt,
 Dorothy Miatt.